United States Patent
Werk et al.

(10) Patent No.: US 11,313,808 B2
(45) Date of Patent: Apr. 26, 2022

(54) VIBRATING INSPECTION DEVICE FOR DETECTION OF PARTICLES IN A LIQUID

(71) Applicant: HOFFMANN-LA ROCHE INC., Little Falls, NJ (US)

(72) Inventors: Tobias Werk, Riehen (CH); Anke Dorn, Kandern (DE); imke Sonja Ludwig, Basel (CH); Hanns-Christian Mahler, Lörrach (DE); Denis Luthringer, Ruelisheim (FR); Carmen Lema Martinez, Bättwil (CH); Jörg Lümkemann, Lörrach (DE)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 174 days.

(21) Appl. No.: 16/312,964

(22) PCT Filed: Jun. 27, 2017

(86) PCT No.: PCT/EP2017/065853
§ 371 (c)(1),
(2) Date: Dec. 21, 2018

(87) PCT Pub. No.: WO2018/002049
PCT Pub. Date: Jan. 4, 2018

(65) Prior Publication Data
US 2020/0182836 A1      Jun. 11, 2020

(30) Foreign Application Priority Data

Jun. 28, 2016 (EP) ..................... 16176600

(51) Int. Cl.
*G01N 21/90* (2006.01)
*G01N 15/10* (2006.01)
(Continued)

(52) U.S. Cl.
CPC ......... *G01N 21/9027* (2013.01); *G01N 15/06* (2013.01); *G01N 15/10* (2013.01);
(Continued)

(58) Field of Classification Search
CPC .... G01N 15/06; G01N 15/10; G01N 15/1468; G01N 21/9027; G01N 2015/0693;
(Continued)

(56) References Cited

U.S. PATENT DOCUMENTS 4,893,320 A * 1/1990 Yanagi .................. G01N 15/10
                                                                  134/184
5,523,560 A * 6/1996 Manique ............ G01N 21/9027
                                                                  250/223 B
(Continued)

FOREIGN PATENT DOCUMENTS

DE   102004051961 A1 *  5/2006  ............. B67C 3/007
EP   0 821 230 A2       1/1998
(Continued)

OTHER PUBLICATIONS

Machine translation of JP2006098385A (Year: 2020).*
(Continued)

*Primary Examiner* — David L Singer
(74) *Attorney, Agent, or Firm* — Medler Ferro Woodhouse & Mills PLLC

(57) ABSTRACT

An inspection device has a particle detector adapted to detect particles in a liquid, the particle detector preferably including a camera. The inspection device including a seat adapted to position a container housing the liquid in an area of operation of the particle detector and a vibration arrangement for vibrating the container. The vibration arrangement includes a frequency generator adapted to provide an electrical signal and a transducer adapted to transduce the electrical signal provided by the frequency generator into an
(Continued)

acoustic wave. The seat is adapted to position the container adjacent to the transducer for inspecting a liquid inside a container with respect to the existence of particles. The inspection device allows for an accurate and gentle inspection of the liquid filled in the container and for detecting particles in the liquid.

10 Claims, 1 Drawing Sheet

(51) Int. Cl.
| | |
|---|---|
| *G01N 29/34* | (2006.01) |
| *G01N 15/06* | (2006.01) |
| *G01N 15/00* | (2006.01) |
| G01N 29/036 | (2006.01) |
| G01N 29/22 | (2006.01) |
| G01N 29/24 | (2006.01) |
| G01N 15/14 | (2006.01) |

(52) U.S. Cl.
CPC ....... *G01N 29/348* (2013.01); *G01N 15/1468* (2013.01); *G01N 29/036* (2013.01); *G01N 29/222* (2013.01); *G01N 29/2418* (2013.01); *G01N 2015/0053* (2013.01); *G01N 2015/0693* (2013.01); *G01N 2291/101* (2013.01)

(58) Field of Classification Search
CPC ............... G01N 29/036; G01N 29/222; G01N 29/2418; G01N 29/348; G01N 2015/0053; G01N 2291/101
See application file for complete search history.

(56) References Cited

U.S. PATENT DOCUMENTS

| | | | | | |
|---|---|---|---|---|---|
| 5,719,679 | A | * | 2/1998 | Shimizu | G01N 21/9027 356/428 |
| 5,880,359 | A | * | 3/1999 | Kono | G01M 3/3209 73/49.3 |
| 2001/0033372 | A1 | * | 10/2001 | Dragotta | G01N 21/51 356/239.5 |
| 2007/0119239 | A1 | * | 5/2007 | Priev | G01N 29/036 73/61.75 |
| 2007/0267351 | A1 | * | 11/2007 | Roach | B01F 11/0283 210/695 |
| 2008/0291438 | A1 | * | 11/2008 | Akkerman | B07C 5/3404 356/240.1 |
| 2010/0011843 | A1 | * | 1/2010 | Smith | G01N 1/44 73/61.71 |
| 2011/0025840 | A1 | * | 2/2011 | Fiegler | G01N 21/9027 348/127 |
| 2013/0292004 | A1 | * | 11/2013 | Ducret | B01F 15/0266 141/351 |
| 2014/0177932 | A1 | * | 6/2014 | Milne | G01N 15/1475 382/128 |
| 2014/0216142 | A1 | * | 8/2014 | Fiegler | G01M 11/088 73/61.75 |
| 2017/0097305 | A1 | * | 4/2017 | Prinz | G06T 7/0004 |
| 2018/0078975 | A1 | * | 3/2018 | Bhoyar | B08B 3/14 |

FOREIGN PATENT DOCUMENTS

| | | | |
|---|---|---|---|
| JP | H06-160305 A | | 6/1994 |
| JP | H10-090109 A | | 4/1998 |
| JP | 11326240 A | * 11/1999 | ......... G01N 21/9027 |
| JP | 2006-098385 A | | 4/2006 |
| JP | 2008-508513 B2 | | 3/2008 |
| WO | 2006/011803 A2 | | 2/2006 |

OTHER PUBLICATIONS

Machine translation of JPH06160305A (Year: 2020).*
Blackstone-NEY Ultrasonics, Fundamentals of Ultrasonic & Megasonic Cleaning, Process Cleaning Magazine (Year: 2009).*
Beck, Precision Cleaning, ProSys (Year: 2005).*
Verhaagen et al, Measuring cavitation and its cleaning effect, Ultrasonics Sonochemistry (Year: 2015).*
Modern Machine Shop, Ultrasonic & Megasonic Cleaning (Year: 2010).*
International Search Report dated Sep. 15, 2017 in corresponding International Patent Application No. PCT/EP2017/065853.
JP Office Action dated May 11, 2021 in corresponding JP Appl. No. 2018-567714.

* cited by examiner

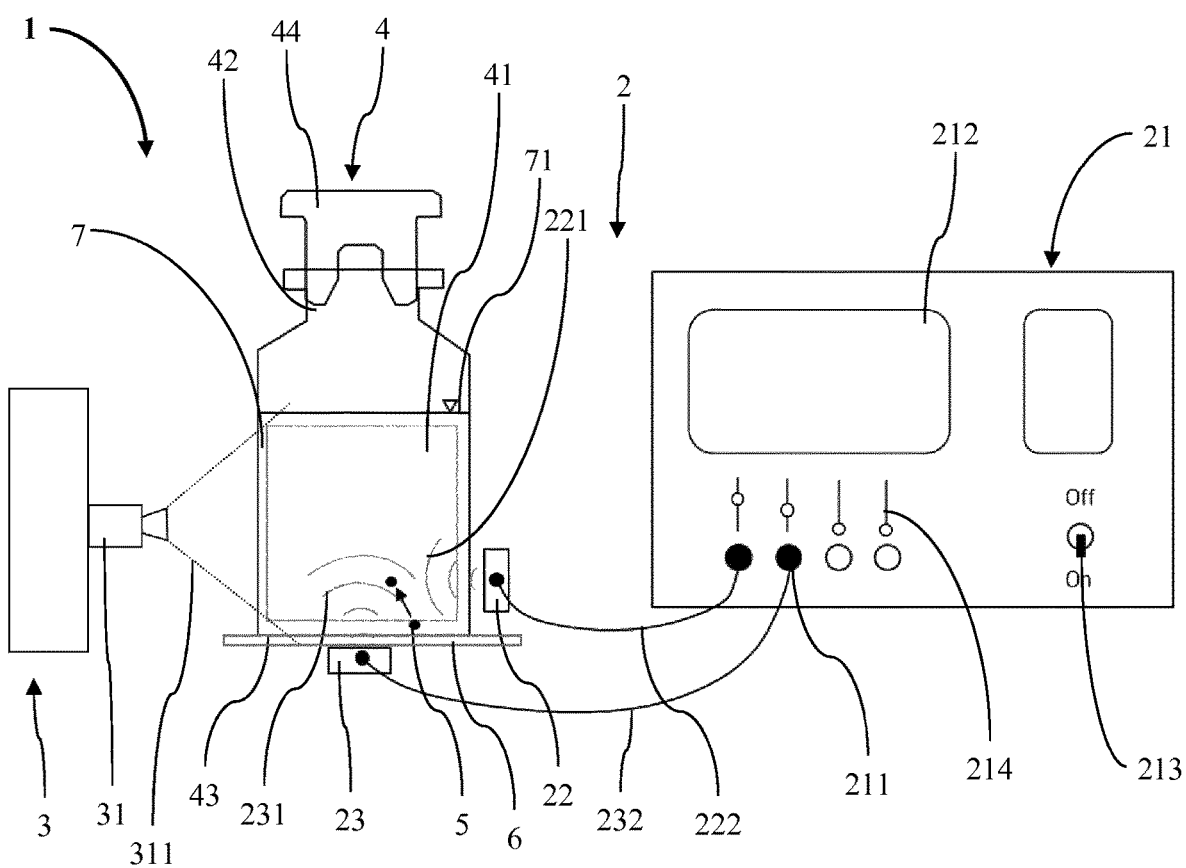

VIBRATING INSPECTION DEVICE FOR DETECTION OF PARTICLES IN A LIQUID

TECHNICAL FIELD

The present invention relates to a vibrating inspection device for detection of particles in a liquid. Such inspection devices having a particle detector adapted to detect particles in a liquid, a seat arranged to position a container in an area of operation of the particle detector, and a vibration arrangement for vibrating the container can be used for inspecting the liquid inside the container with respect to the existence of particles.

BACKGROUND ART

Many types of liquids such as parenterals or other liquid drugs, nutritions or beverages are frequently controlled for the absence of foreign particulates before they are further processed. For example, liquid drugs have to be fully inspected for the absence of particles before being introduced to the market. The inspection process is typically a visual or optoelectronical inspection by trained humans, an inspection system or a combination of both.

For allowing an accurate detection of foreign particulates in the liquid, usually a mobilization of particles is part of the inspection process. This mobilization process makes sure that particles can be detected in the liquid, even though they are on the base of the container, stuck at the container walls or floating on the surface of the liquid that is to be inspected. For mobilization it is known to shake, vibrate or rotate the container for moving the foreign particles. For example, U.S. Pat. No. 8,576,279 B2 describes an inspection system for detecting foreign bodies in a beverage wherein the beverage bottle is vibrated within the inspection process.

However, such mobilization can lead to several problems during the inspection process. For example, it can introduce air bubbles into the product that disturb the inspection process by hiding floating particles or mimicking particles in the liquid. Or, it can transport particles that are in the liquid to the surface of container closure systems where they can get stuck because of adhesion forces or electrostatic effects and afterwards they are harder to detect especially for optoelectronical detectors. And last but not least, any form of normal shaking or usual pre-rotation typically is not compatible with an inspection of liquid product in an open or partially open container. This can be particularly important in connection with chemical or biological pharmaceutical liquids which have to be dried such as freeze dried. If a drying process follows the inspection, the container usually is still open to allow for sublimation or evaporation during the drying process. Shaking or pre-rotation can lead to spill of product and potential product residue in the area of the container closure system, potentially leading to failed Container Closure Integrity (CCI). Furthermore, it needs to be avoided that product gets in contact with the primary container above the normal fill level. If the area above the fill level is in contact with product and a drying process follows, product residues can dry at the wall of the container which can lead to cosmetic or critical defects.

Therefore, there is a need for a device or system allowing an accurate and gentle inspection of a liquid filled in a container for detecting particles in the liquid such as, for example, for detecting particles in a liquid before a freeze drying step in a pharmaceutical preparation process.

DISCLOSURE OF THE INVENTION

According to the invention an inspection device is provided that permits an accurate and gentle inspection of a liquid filled in a container for detecting particles in the liquid such as, for example, for detecting particles in a liquid before a freeze drying step in a pharmaceutical preparation process.

In particular, the invention deals with an inspection device for inspecting a liquid inside a container with respect to the existence of particles. The inspection device comprises a particle detector adapted to detect particles in the liquid inside the container, a seat arranged to position the container in an area of operation of the particle detector, and a vibration arrangement for vibrating the container. The vibration arrangement comprises a frequency generator to provide an electrical signal and a transducer adapted to transduce the electrical signal provided by the frequency generator into an acoustic wave. The seat is arranged to position the container adjacent to the transducer.

The term "liquid" as used herein can relate to any flowable substance such as a liquid drug, a nutrition, a beverage or the like. It can particularly relate to a chemical, biochemical, biological or pharmaceutical substance, e.g., intended for being lyophilized.

The term "particles" in connection with the liquid inside the container can relate to any bodies or solid particulates being present in the liquid. Such particles can, e.g., comprise fibers or particles intrinsic to the liquid. They can further comprise foreign bodies such as glass, e.g., originating from the container or metal, e.g., originating from a cap of the container.

The term "adjacent" with regard to the container and the transducer can relate to a position allowing the acoustic wave to vibrate the container and particularly the liquid inside the container. Thereby, adjacent does not exclude anything other being arranged between the transducer and the container as long as acoustic waves of sufficient intensity or quality can be transferred to the container or liquid. Advantageously, the container is adjacent to the transducer such that the acoustic waves can essentially unhinderedly travel from the transducer to the container or liquid.

The frequency generator can be an electronic apparatus connected to the transducer, e.g., via a cable or the like. It can be equipped with a regulator for adjusting the frequency to be provided and a display for indicating the adjusted frequency. The frequency generator can further have a power wire which is connected to an electric energy source, e.g., via a plug or a similar connector.

The seat can have a structure for holding or supporting the container which is adapted to the shape and form of the container. For many containers having a flat bottom such as, e.g., vials the seat can have a horizontal plane surface onto which the container can be placed.

The inspection device allows for applying a high frequency and low amplitude shaking to the container. By such vibration of the container particles being present in the container can efficiently be mobilized or dispersed in the liquid inside the container such that they can efficiently be identified or traced. In particular, it allows for essentially mobilizing the particles whereas the liquid can be kept comparably calm. This makes a comparably fast and accurate inspection possible as well as a prevention or at least reduction of air bubble production in the liquid, an improved immobilization of floating or grounded particles, a prevention of disposition of particles on the container closure systems and a comparably efficient implementation in a chemical or pharmaceutical preparation process including freeze drying.

Thus, the inspection device according to the invention allows for an accurate and gentle inspection of the liquid filled in the container and for detecting particles in the liquid. The inspection device can be particularly suitable for detecting particles in liquids before a freeze drying step in a pharmaceutical preparation process where a comparably high precision and reliability is to be achieved.

Preferably, the acoustic wave is an ultrasonic acoustic wave. More particularly, the transducer can adapted to transduce the electrical signal provided by the frequency generator into an ultrasonic acoustic wave. Such ultrasonic waves at appropriate frequencies allow for a particularly efficient and suitable inspection.

The inspection of the liquid can particularly be an optoelectronic or optical (visual) inspection. Thereby, the particle detector preferably comprises a camera. When using a camera, the area of operation of the particle detector can be defined by the field of view of the camera. In particular, the camera can be positioned such that a transparent section of the container is in its field of view which allows for an efficient inspection through the transparent section.

For increasing efficiency of the inspection, the particle detector can further comprise one or plural light sources. Such light sources may efficiently illuminate the container and its interior and thereby the liquid. For example, the light source of the particle detector can be arranged below the seat such that, in use, it is located below the container. Like this, the illumination can be provided through the bottom of the container which has been shown to be particularly efficient. Also, for optimizing the inspection of the container and for optimizing the equipment design the particle detector can comprise one or more mirrors guiding the optical detection and/or illumination.

The transducer of the vibration arrangement preferably is a piezoelectric transducer. Such a piezoelectric transducer allows for efficiently providing ultrasonic waves thereby inducing comparably fast (high frequency) vibrations to a comparably low extent (low amplitude). The transducer can have any shape suitable for its intended application. For example, it can be cuboid, cylindrical, cuboid with a cylindrical hole, cylindrical with a cylindrical hole, ring-shaped, ring-sector-shaped, any combination thereof or the like. In particular, the shape of the transducer can be adapted to optimize the transfer of the acoustic wave to the container.

Preferably, the vibration arrangement comprises a further transducer adapted to transduce a further electrical signal into a further acoustic wave, the seat is arranged to position the container adjacent to the further transducer, the acoustic wave generated by the transducer of the vibration arrangement has a first frequency, and the further acoustic wave generated by the further transducer of the vibration arrangement has a second frequency different from the first frequency.

Having plural transducers allows for a more complete vibration of the liquid or container. Furthermore, it allows for providing varying vibration movements which makes it possible to efficiently mobilize particles of varying sizes, shapes and consistence.

The further electrical signal can be provided by a further frequency generator. However, preferably, the frequency generator of the vibration arrangement is adapted to provide the further electrical signal to the further transducer. Such a frequency generator providing both, the electrical signal as well as the further electrical signal allows for an efficient implementation of the inspection device. The frequency generator can be equipped with means for adjusting the single electrical signals independently.

The first frequency preferably is in a range of about 0.5 MHz to about 2 MHz. Such a comparably high frequency can be particularly suitable for mobilizing fibers and intrinsic particles. The second frequency preferably is in a range of about 20 kHz to about 50 kHz. Such lower frequency allows to form standing waves in the liquid due to their reflection at the liquid surface. Standing waves are efficient for moving comparably heavy particles such as, e.g., glass or metal. Particularly efficient might be to apply comparably high frequencies by the transducer at a side wall portion of the container and to apply comparably low frequencies by the further transducer at the bottom of the container. This allows for an efficient, fast and complete mobilization of different kind of particles in the liquid which can then be identified.

Preferably, the container has a side wall portion and a bottom portion and the seat is arranged to position the side wall portion of the container adjacent to the transducer of the vibration arrangement and the bottom portion of the container adjacent to the further transducer of the vibration arrangement. Such an arrangement allows for an efficient operation of the first and second transducers particularly allowing an accurate provision of different waves.

Preferably, the electrical signal is a pulsed electrical signal and the acoustic wave transduced by the transducer of the vibration arrangement is a pulsed acoustic wave. Similarly, the further electrical signal preferably is a pulsed electrical signal and the further acoustic wave transduced by the further transducer of the vibration arrangement preferably is a pulsed acoustic wave. Such pulsed electrical signals and acoustic waves allow for minimizing the amount of energy introduced into the liquid which might avoid the risk of damaging the liquid, e.g., being a drug product. Thereby, the transducer of the vibration arrangement and the further transducer of the vibration arrangement preferably are arranged to intermittently provide the acoustic wave and the further acoustic wave to the container.

Preferably, the particle detector is arranged to laterally observe the container. Compared to observing the container from other sides such as through the bottom, laterally observing the container can allow for an interference-free monitoring of the liquid. Thereby, particles in the liquid can be identified in a comparably reliable and efficient manner.

The term "container" as used herein can relate to any reservoir suitable for storing and transporting a liquid. Where the liquids are medicaments or the like, the container preferably is a vial. Thereby, the term "vial" can relate to any vial in the literal sense, i.e. a comparably small vessel or bottle, often used to store pharmaceutical products or pharmaceuticals or medications in liquid, powdered or capsuled form. The vial can be made of a sterilisable material such as glass or plastic such as, e.g., polypropylene.

Preferably, the inspection device comprises a conveying unit adapted to move the container along the transducer of the vibration arrangement. The conveyor unit can move the complete seat together with the container to pass the vibration arrangement or it can move the container along the seat. It can for example comprise a moving belt onto which the container is arranged. Or it can comprise plural moving belts between which the container is clamped to be forwarded. Such a conveying unit allows for efficiently processing containers in an automated manner which makes an efficient inspection on an industrial scale possible.

BRIEF DESCRIPTION OF THE DRAWINGS

The inspection device according to the invention is described in more detail herein below by way of an exemplary embodiment and with reference to the attached drawing which shows a schematic view of an embodiment of the inspections device according to the invention.

DESCRIPTION OF EMBODIMENTS

In the following description certain terms may be used for reasons of convenience and are not intended to limit the invention. The terms "right", "left", "up", "down", "under" and "above" refer to directions in the FIGURE. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes includes various special device positions and orientations.

To avoid repetition in the FIGURE and the descriptions of the various aspects and illustrative embodiments, it should be understood that many features are common to many aspects and embodiments. Omission of an aspect from a description or FIGURE does not imply that the aspect is missing from embodiments that incorporate that aspect. Instead, the aspect may have been omitted for clarity and to avoid prolix description.

FIG. 1 shows an embodiment of the inspection device 1 according to the invention which comprises a seat 6, a particle detector 3 and a vibration arrangement 2. The seat 6 has a horizontal top surface onto which a vial 4 as a container is placed. The vial 4 has an essentially cylindrical glass body with a sidewall 41, a bottom 43 and a neck 42. The neck 42 of the body has an open top end which is loosely closed by a lyophilisation stopper 44. The body of the vial 4 houses a liquid drug product 7 which is intended to be lyophilized. The liquid 7 has a specific fill level 71.

The particle detector 3 is positioned besides the vial 4. It is equipped with a camera 31. The camera 31 is arranged and adjusted such that the side wall 41 of the vial 4 is in its field of view 311. Thereby, the camera 31 laterally observes the vial 4 and the liquid 7 inside the vial 4.

The vibration arrangement 2 comprises a frequency generator 21, a piezoelectric transducer 22 and a piezoelectric further transducer 23. The frequency generator 21 has four slots 211 one of which being connected to the transducer 22 via a first cable 222 and another one of which being connected to the further transducer 23 via a second cable 232. Above each slot 211 the frequency generator 21 has a controller 214. Each controller 214 is associated to one of the slots 211 in order to adjust an electric signal provided via the slot 211. The frequency generator 21 is further equipped with a power switch 213 and displays 212 showing parameters adjusted.

The transducer 22 is arranged besides the vial 22 such that it is positioned laterally adjacent to the side wall 41 of the vial 4. The further transducer 23 is arranged below the vial 22 such that it is positioned underneath adjacent to the bottom 43 of the vial 4. The frequency generator 21 provides a first pulsed electric signal to the transducer 22 via the first cable 222. This first electric signal is adjusted such that it is transduced by the transducer 22 into first ultrasonic waves 221 having a frequency in a range from about 0.5 MHz to about 2 MHz. Similarly, the frequency generator 21 provides a second pulsed electric signal to the further transducer 23 via the second cable 232. The second electric signal is adjusted such that it is transduced by the further transducer 23 into further or second ultrasonic waves 231 having a frequency in a range from about 20 kHz to about 50 kHz.

The transducer 22 provides the first waves 221 from right to left via the sidewall 41 into the liquid 7 inside the vial 4. Due to the comparably high frequency of the first waves 221 they do primarily mobilize fibres and intrinsic particles 5 in the liquid 7. In addition to that, the further transducer 23 provides the second waves 231 bottom up via the bottom 43 into the liquid 7 inside the vial 4. Due to reflection at a top surface of the liquid 7 the comparably low frequency second waves form standing waves which are primarily able to move comparably heavy particles 5. By means of the particle detector 3 the mobilized particles 5 can efficiently be detected in an accurate and gentle manner.

This description and the accompanying drawing that illustrate aspects and embodiments of the present invention should not be taken as limiting—the claims defining the protected invention. In other words, while the invention has been illustrated and described in detail in the drawing and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the FIGURE individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled,

The invention claimed is:

1. An inspection device for inspecting a liquid inside a container with respect to the existence of particles comprising:
   a particle detector adapted to detect particles inside the liquid;
   a seat arranged to position the container in an area of operation of the particle detector; and
   a vibration arrangement for vibrating the container, wherein the vibration arrangement comprises
      a frequency generator to provide an electrical signal, and
      a transducer adapted to transduce the electrical signal provided by the frequency generator into an acoustic wave, and
      a further transducer adapted to transduce a further electrical signal into a further acoustic wave,
   wherein the container has a side wall portion and a bottom portion, and the seat is arranged to position the side wall portion of the container adjacent to the transducer of the vibration arrangement and the bottom portion of the container adjacent to the further transducer of the vibration arrangement,
   wherein the particle detector is disposed adjacent to the side wall portion of the container,
   wherein the acoustic wave generated by the transducer of the vibration arrangement has a first frequency in a range of about 0.5 MHz to about 2 MHz for mobilizing fibers and intrinsic particles in the liquid,
   wherein the further acoustic wave generated by the further transducer of the vibration arrangement has a second frequency in a range of about 20 kHz to about 50 kHz that reflects at a top surface of the liquid to form standing waves for moving heavy particles in the liquid, and
   wherein the application of the first frequency applied at the side wall portion of the container and the second frequency applied at the bottom portion of the container allows for mobilization of different kinds of particles in the liquid which can then be identified.

2. The inspection device according to claim 1, wherein the acoustic wave is an ultrasonic acoustic wave.

3. The inspection device according to claim 1, wherein the particle detector comprises a camera.

4. The inspection device according to claim 1, wherein the transducer of the vibration arrangement is a piezoelectric transducer.

5. The inspection device according to claim 1, wherein the frequency generator of the vibration arrangement is adapted to provide the further electrical signal to the further transducer.

6. The inspection device according to claim 1, wherein the electrical signal is a pulsed electrical signal and the acoustic wave transduced by the transducer of the vibration arrangement is a pulsed acoustic wave.

7. The inspection device according to claim 1, wherein the further electrical signal is a pulsed electrical signal and the further acoustic wave transduced by the further transducer of the vibration arrangement is a pulsed acoustic wave.

8. The inspection device according to claim 1, wherein the transducer of the vibration arrangement and the further transducer of the vibration arrangement are arranged to intermittently provide the acoustic wave and the further acoustic wave to the container.

9. The inspection device according to claim 1, wherein the particle detector is arranged to laterally observe the container.

10. The inspection device according to claim 1, wherein the container is a vial.

* * * * *